United States Patent [19]

Betancourt et al.

[11] 4,272,321

[45] Jun. 9, 1981

[54] NUCLEAR REACTOR INTERNALS AND CONTROL ROD HANDLING DEVICE

[75] Inventors: George N. Betancourt, Manchester; William W. Etzel, New Hartford, both of Conn.

[73] Assignee: Combustion Engineering, Inc., Windsor, Conn.

[21] Appl. No.: 911,628

[22] Filed: Jun. 1, 1978

[51] Int. Cl.³ ............................................. G21C 7/08
[52] U.S. Cl. .................................. 176/87; 176/36 C
[58] Field of Search ............... 176/30, 33, 35, 36 R, 176/36 C, 87

[56] References Cited

U.S. PATENT DOCUMENTS

| | | | |
|---|---|---|---|
| 3,227,624 | 1/1966 | Lechevallier | 176/36 R |
| 3,936,089 | 2/1976 | Hoffmeister | 176/36 R X |
| 3,938,845 | 2/1976 | Fehl et al. | 176/36 R X |
| 3,967,741 | 7/1976 | Hoffmeister | 176/36 R X |
| 3,977,939 | 8/1976 | Frisch et al. | 176/36 R |
| 3,989,589 | 11/1976 | Frisch et al. | 176/36 R |
| 4,030,973 | 6/1977 | Hoffmeister et al. | 176/30 X |

Primary Examiner—Peter A. Nelson
Attorney, Agent, or Firm—L. James Ristas

[57] ABSTRACT

A method and apparatus for removing, in an essentially continuous operation, the control rods and the upper guide structure from a nuclear reactor vessel during refueling. The apparatus includes a rigid frame which is secured to the upper guide structure after the vessel head is removed. A platform is vertically reciprocable within the frame and is adapted to engage and lift simultaneously all control rod drive shafts to a maximum elevation within the frame. A mechanical interface between the platform and the frame is provided so that continuation of the lifting force on the platform transfers the lift force to the frame whereby the upper guide structure is lifted out of the vessel. Automatically operated stop means are provided to lock the platform and rods in the maximum elevation within the frame in order to prevent accidental dropping of the rods during transfer of the upper guide structure and control rods to a temporary storage area.

12 Claims, 11 Drawing Figures

NUCLEAR REACTOR INTERNALS AND CONTROL ROD HANDLING DEVICE

BACKGROUND OF THE INVENTION

This invention relates to devices for handling heavy components within a nuclear reactor, and in particular for removing and reinserting reactor internals and control rods during refueling.

Commercial nuclear power reactors have a plurality of fuel assemblies containing fissile fuel material wherein heat is generated and transferred to the working fluid. In a typical reactor, many of the fuel assemblies must be periodically replaced in order to maintain a sufficient level of core reactivity so that the nuclear fission process can be self-supporting. Refueling usually represents the largest time period during which the reactor is not producing power, and therefore every effort is made to minimize the refueling time.

The refueling operation includes removal from the reactor of internal structures such as the upper guide structure, and possibly control rods, so that the fuel assemblies are accessible for easy removal or rearrangement. Refueling is particularly time-consuming in those reactors which utilize the kind of upper guide structure described in U.S. Pat. No. 3,849,257. In such reactors, both the upper guide structure (UGS) and the control rods must be removed from the reactor before access can be had to the fuel assemblies. Previously, the control rods were individually removed from the reactor and hung in a temporary storage area. Then an overhead crane would lift the UGS and place it on a support platform.

It can be appreciated that the removal of individual control rods, the removal of the UGS, the reinsertion of the UGS, and the reinsertion of the individual control rods require many manual operations, during which several persons are exposed to radiation from the reactor core.

SUMMARY OF THE INVENTION

It is evident that a significant reduction in the reactor refueling time can be achieved if the control rods and UGS can be removed from the reactor in a single continuous operation, stored as a unit, and reinserted in a single continuous operation.

According to the invention, a method and apparatus are provided for engaging all control rods and simultaneously lifting them out of the reactor core until the rods are fully withdrawn from the core and are within the upper guide structure, after which the lifting force is automatically transferred to the UGS so that it and the control rods may simultaneously be lifted out of the reactor vessel. The UGS with the rods protected therein can then be transferred as a single unit to a storage area.

The invention further provides means by which the rods are prevented from moving within the UGS during the entire period that the UGS is disengaged from the reactor vessel.

After the shuffling of the fuel assemblies is complete, the UGS and control rods are reinserted into the reactor vessel in reverse sequence.

DESCRIPTION OF THE PREFERRED EMBODIMENT

Figure 1:
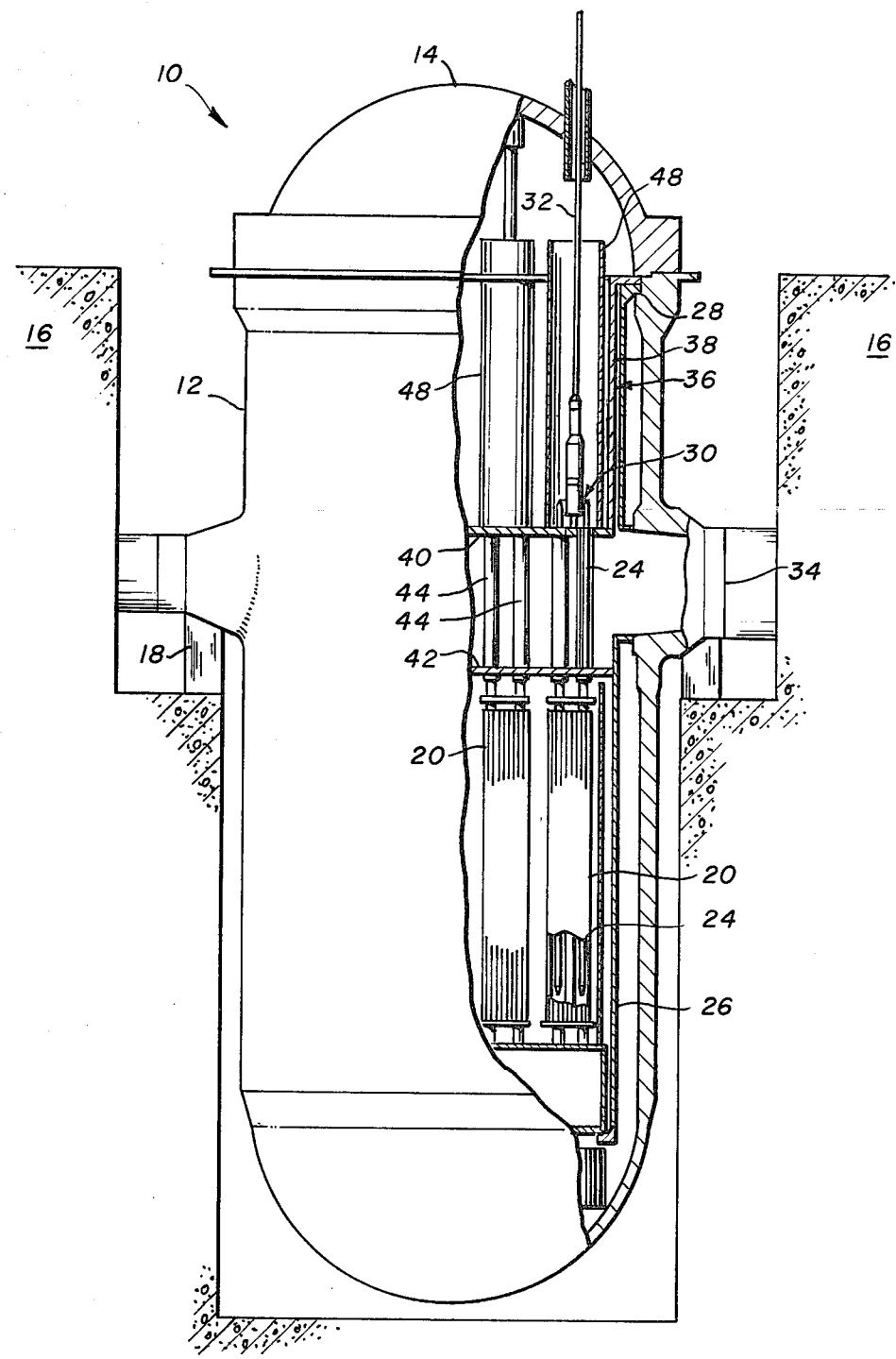
FIG. 1 shows a partial cutaway elevation view of a nuclear reactor having an upper guide structure of the type that must be removed prior to rearranging the fuel assemblies.

FIG. 1 shows a reactor 10 comprising the reactor vessel 12 and the reactor closure head 14. The reactor 10 is located within the reactor cavity defined by the cavity walls 16, and is supported therein by struts 18. During normal operation, the lower portion of the vessel 12 contains fuel assemblies 20 within which control rod fingers 24 reciprocate. The weight of the fuel assemblies 20 is borne by the core support barrel 26, which hangs from the lip 28 on the upper end of the vessel 12.

Each rod finger 24 is part of a control rod 30, which typically includes four to twelve fingers 24 and which has a drive shaft 32 by which the rod 30 may be reciprocated from above. The control rod 30 passes through the area of strong lateral forces generated by the reactor coolant as it changes direction from the vertical along the assemblies 20 to the horizontal as it exits through the outlet nozzle 34. Protection of the fingers 24 is provided by the upper guide structure (UGS) 36 which, like the core support barrel 26, depends from the lip 28. The UGS 36 comprises an upper barrel portion 38 to which are rigidly attached upper and lower tube sheets 40, 42. Tubes 44 are rigidly connected between the upper and lower tube sheets whereby the fingers 24 may be reciprocated therein without being affected by the lateral flow forces.

In the space above the upper tube sheet 40, each control rod 30 and its associated drive shaft 32 are surrounded by a shroud 48, each of which is connected to the upper tube sheet 40. It can be seen that over the full range of control rod reciprocation, the rod fingers 24 of each rod 30 are positively maintained in spaced relationship by the corresponding fuel assembly 20 and tubes 44, and the rods 30 are separated from each other by the shrouds 48.

Figure 2:
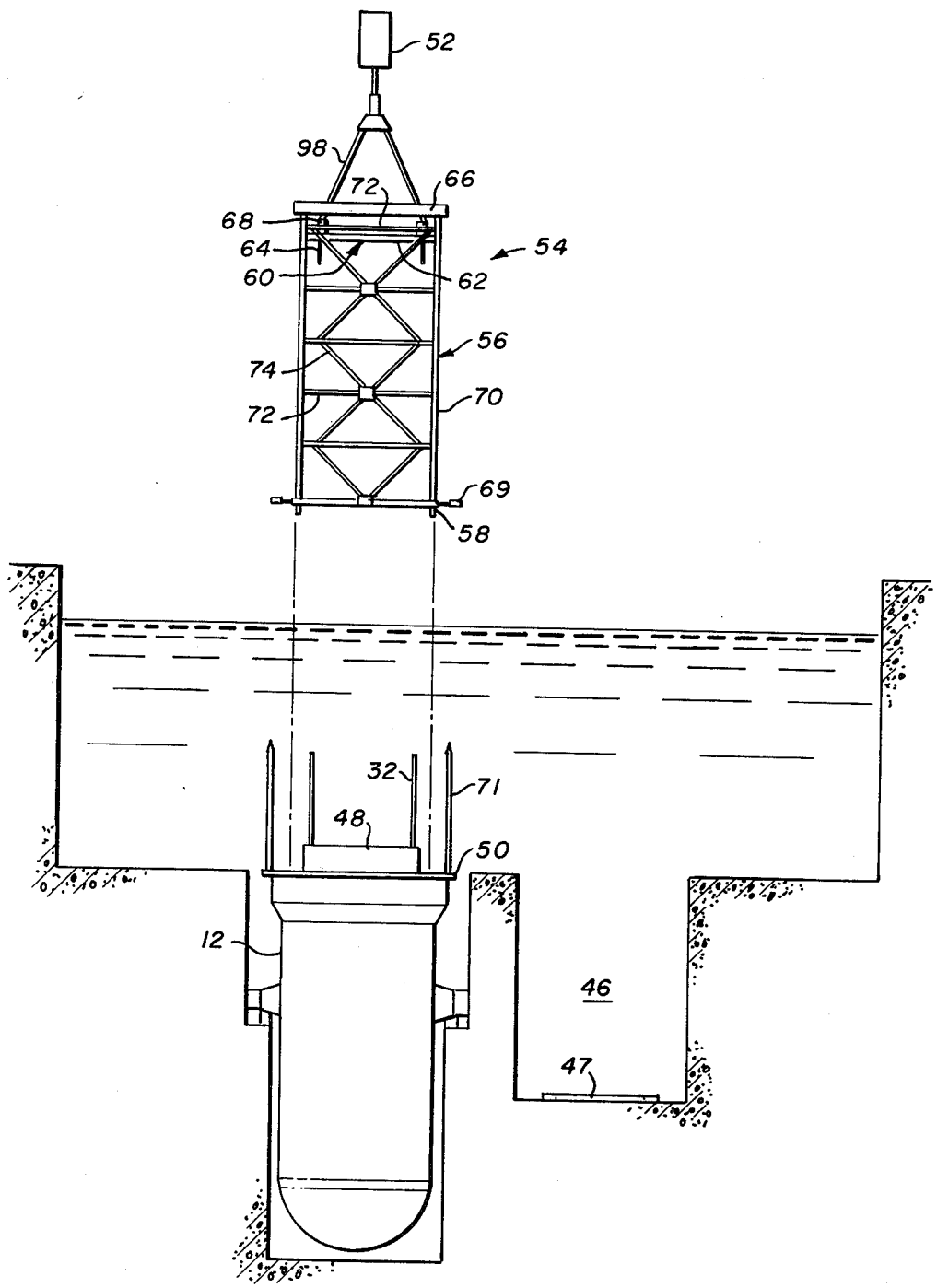
FIG. 2 shows the inventive apparatus in position to be lowered onto the reactor vessel during refueling.

Referring now to FIG. 2, the first step in the refueling process is to fill the vessel 12 and much of the installation surrounding the vessel with water to an elevation approximately 25 feet above the level of the reactor ledge 50. When the closure head 14 is removed, only the shrouds 48 and the control rod drive shafts 32 extend above the elevation of the ledge 50. In modern nuclear reactors, there may be up to 100 drive shafts 32, but to simplify the description of the preferred embodiment only two shafts are shown. Likewise, there are up to one hundred shrouds 48, which are for simplicity shown as presenting a solid surface. Reactor installations include an overhead crane 52 which can be positioned above the vessel 12 and the UGS storage pit 46.

The inventive apparatus is a lift rig 54, shown suspended from the crane 52 and positioned directly over the vessel 12, for removing and reinserting the upper guide structure 36 and control rods 30. The rig 54 comprises a frame 56 having attachment means 58 at its lower end, a rod support member 60 reciprocable within the frame including a horizontal platform 62 and a plurality of gripper means 64. The upper end of the frame 56 has cross beams 66 which provide an interference surface to limit the upward travel of the rod support member 60. In the preferred embodiment, the platform 62 is connected to the crane 52 through tie rods 98 and link blocks 68. The link blocks 68 are adapted to interfere with the cross beams 66 and transfer the upward force of the crane from the platform 62 to the frame 56 when the platform 62 is in the maximum upward position relative to frame 56. The lower end of the frame 56 includes alignment collars 69 which, as described below, aid in properly positioning the rig 54 onto the UGS. In FIG. 2 the rig 54 is shown as having only two columns 70. This is for illustrative purposes, since three equidistant columns 70 are preferred, connected by cross bars 72 and diagonal braces 74 according to the load that must be handled.

Figure 3:
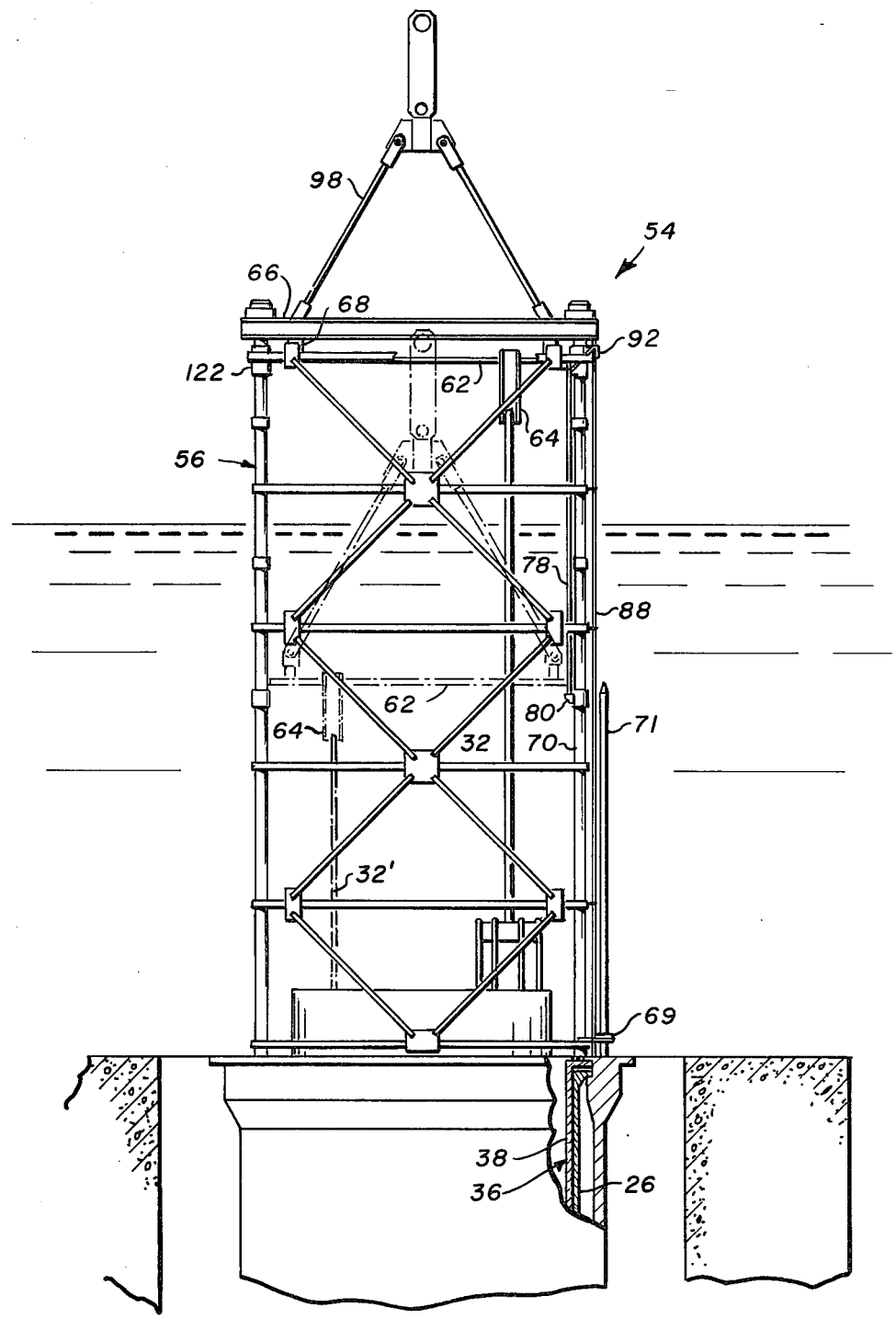
FIG. 3 shows the inventive apparatus connected to the upper guide structure illustrating the reciprocable control rod support member in the lowermost position for engaging the control rod drive shafts and in the uppermost position preparatory to removal of the upper guide structure from the vessel.

As indicated in FIGS. 2 and 3, alignment posts 71 are attached to the vessel 12 and then the closure head 14 is removed. The rig 54 is then lowered towards the vessel 12 until the alignment collars 69 register with the alignment posts 71, thereby assuring that when the rig 54 is fully lowered the attachment means 58 will be properly positioned with respect to the UGS. As shown in FIG. 5b, the attachment means 58 engages a threaded opening 82 in the rim 39 of the UGS barrel 38. The attachment means 58 is conventional and does not in itself constitute the invention. In this embodiment of the invention, the attachment means 58 is a bolt which is operated from the upper end of the rig by means of a wrench 86 disposed within the column 70.

Referring again to FIG. 3, once the attachment means 58 are secured, the crane 52 lowers the platform 62 within the frame 56 until the gripper means 64 are immediately above the drive shafts 32. This position of the platform 62 and gripper means 64 is shown by phantom lines. The single phantom shaft 32' shows one of nearly 100 drive shafts 32 representing the control rods 30 in their lowest position in the vessel 12, i.e., inserted to the bottom of the assemblies 20 in FIG. 1. Upon inspection that registry of grippers 64 and shafts 32 is accurate, (guide structuring may be added to independently assure accurate registry) the platform 62 is lowered to its maximum downward position against lower stop 80 whereby the gripper means 64 simultaneously engage all drive shafts 32. A slight upward movement of the platform 62 automatically locks the shafts within the gripper means 64. The details of the gripper means 64 are disclosed in co-pending U.S. application Ser. No. 842,576, filed Oct. 17, 1977, "Extension Shaft Latching Mechanism for a Nuclear Reactor Control Rod Lift Rig." The platform 62 is then lifted through the frame 56, simultaneously lifting all control rod fingers 24 out of the fuel assemblies 20 and into the tubes 44 and shrouds 48 of the UGS 36 (shown in FIG. 1). The platform 62 in its highest position relative to the frame 56 is shown in solid lines in FIG. 3.

When the platform 62 is in the highest position and the crane 52 continues pulling, the upward force is transferred by the link blocks 68 from the platform 62 to the cross beams 66, which are adapted to mate with link blocks 68. The crane then lifts the entire rig 54 which in turn lifts the UGS 36 out of the vessel 12. The UGS 36 is lifted without the danger of the control rod fingers 24 being damaged because, as described above, the fingers are always within the protective surrounding of tubes 44 and shrouds 48.

Figure 4:
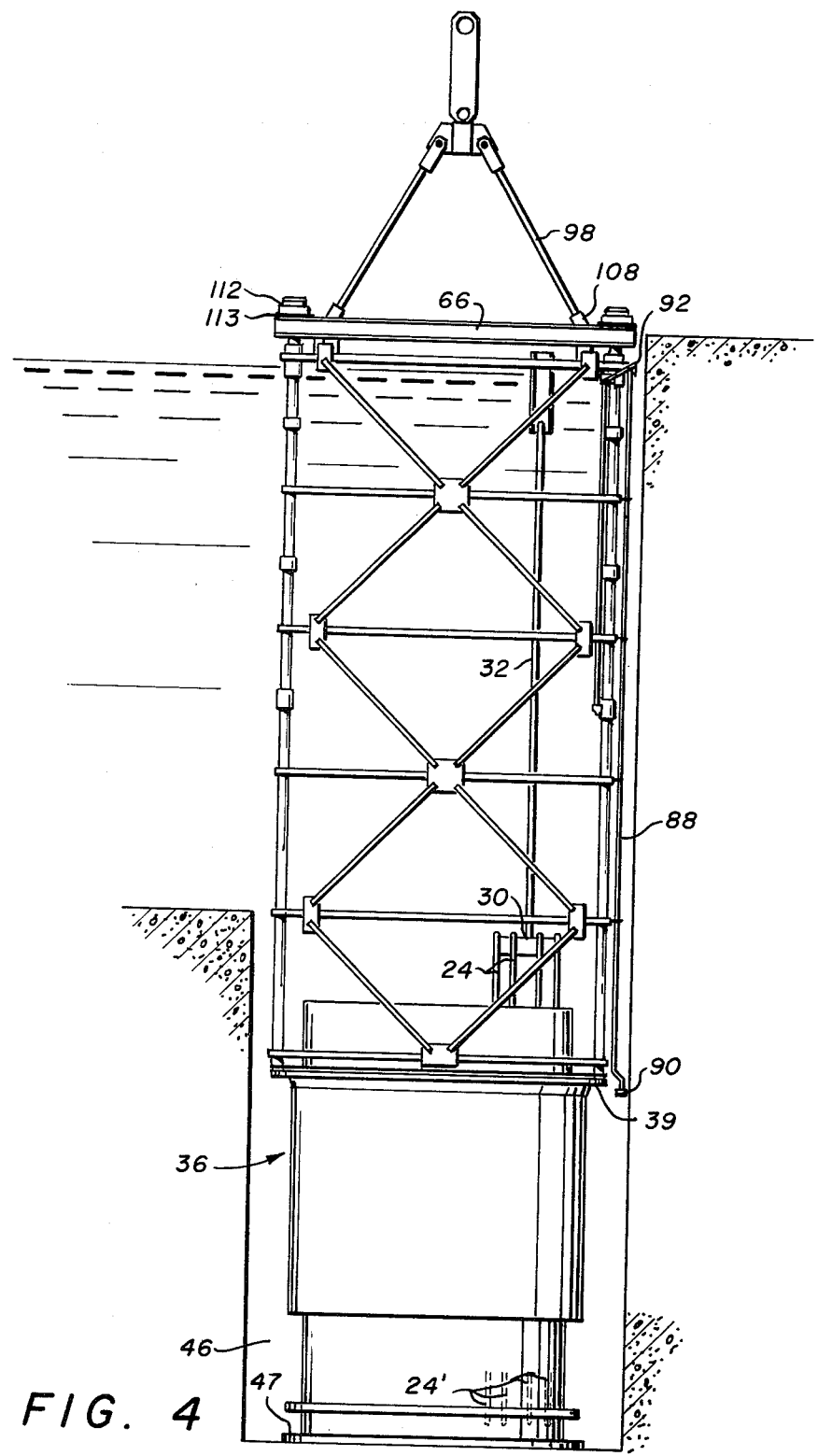
FIG. 4 shows the inventive apparatus wherein the control rods are locked in the uppermost position within the frame while the upper guide structure rests in temporary storage.

After the UGS 36 is clear of the vessel 12, the crane 52 is moved laterally until the rig 54 and UGS 36 are above the temporary storage pit 46 shown in FIG. 4. The crane 52 is lowered until the base of the UGS 36 rests on a stand 47 on the floor of the storage pit 46. In the preferred embodiment, the platform 62 carrying the control rods 30 is locked in the maximum upward position as soon as possible so that any slack in the crane 52 after the upper guide structure 36 is resting on the stand 47 will not cause the platform 62 to apply a compressive load on the control rod fingers 24. The lower tips of the fingers 24' are shown in phantom in their storage position in the UGS when the platform 62 is properly locked.

After the platform 62 is locked in the up position with the UGS 36 on the floor stand 47, the tie rods 98 and cross beams 66 may be disengaged from the rig 54 and repositioned over the vessel 12 in order to remove other reactor internals if the need arises. For example, the core support barrel 26 can be removed during a refueling operation if inspection is required or a modification must be made to the structures in the lower portion of the vessel 12. This feature will be more fully described below.

It can be appreciated that the method and apparatus generally described above provide an efficient, essentially continuous way of safely performing an otherwise very time-consuming operation. In particular, heavy components such as the UGS 36 and very delicate components such as the control rod fingers 24 are sequentially and continuously moved remotely while under water. The general description and operation of the invention having been described, a more detailed description of the various parts will be presented.

Figure 6:
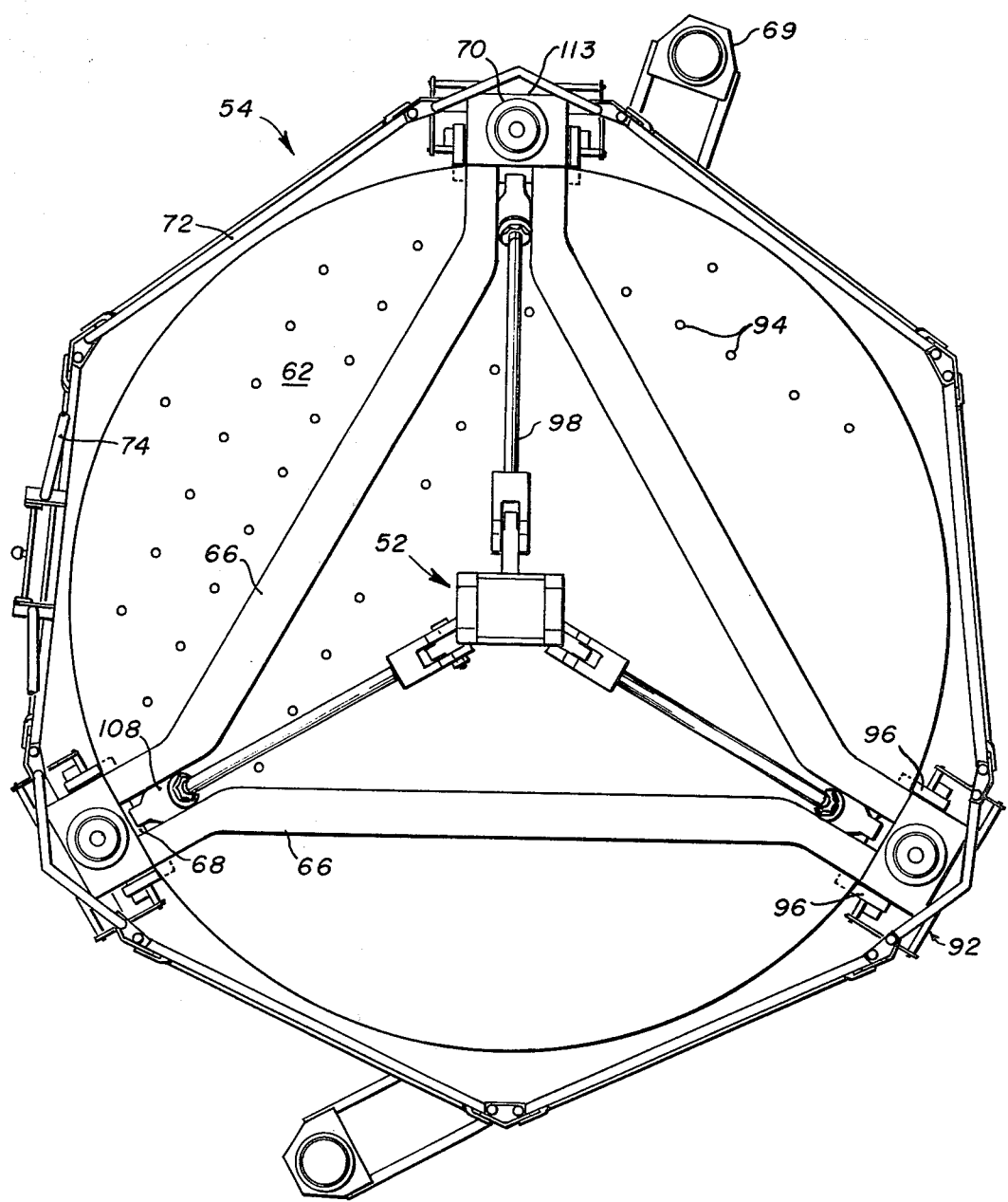
FIG. 6 shows a plan view of the rig as shown in FIG. 4, but with more detail.

FIG. 6 shows a plan view of the rig 54 showing the equilaterally spaced columns 70, the alignment collars 69, the braces 72, 74 and the cross beams 66. The platform 62 occupies most of the cross section inside the frame 56, and contains a multiplicity of holes 94 through which the gripper means 64 (see FIG. 2) may be attached to its underside. The platform 62 is reciprocated within the frame 56 by the action of crane 52 through the tie rods 98 and tie rod tongue 108. The entire rig 54 is lifted by the interaction of the link block 68 with the interference beams 66, which in the preferred embodiment are formed as a delta beam spreader.

Figure 7:
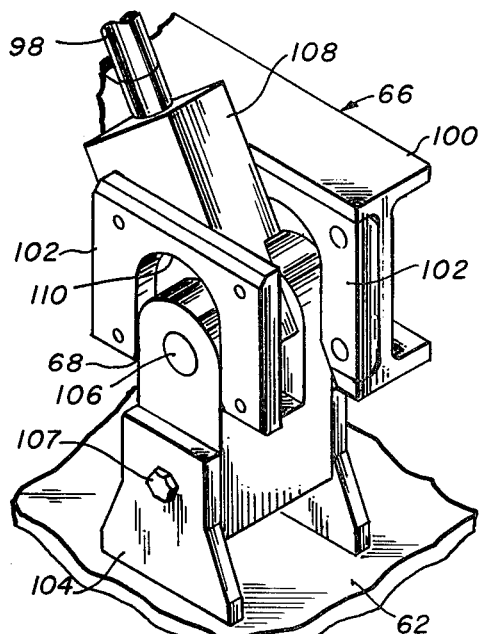
FIG. 7 shows the link block which transfers the lifting force from the rod support member to the interference beam.

FIG. 7 is a more detailed view of the connection between the platform 62 and the tie rods 98. The link block 68 is connected to the platform 62 by a yoke 104 and is connected to the tie rod tongue 108 by means of a link pin 106 running through the opening (not shown) on the lower end of the tie rod tongue 108. The cross beam 66 (only one shown fully) consist of I-beams 100 in which an interference plate 102 is attached to the surface of each I-beam 100 facing the tongue 108. The interference plate 102 has a recessed portion 110 forming a curved surface adapted to mate with the contoured upper portion of the link block 68. It can be seen that as the crane 52 lifts the platform 62 to its maximum height within the frame 56, the upward force of the crane 52 will be transferred through the link block 68 to the cross beams 66. It is to be understood that other arrangements not requiring positive mating may be used without departing from the scope of the invention.

Figure 5A:
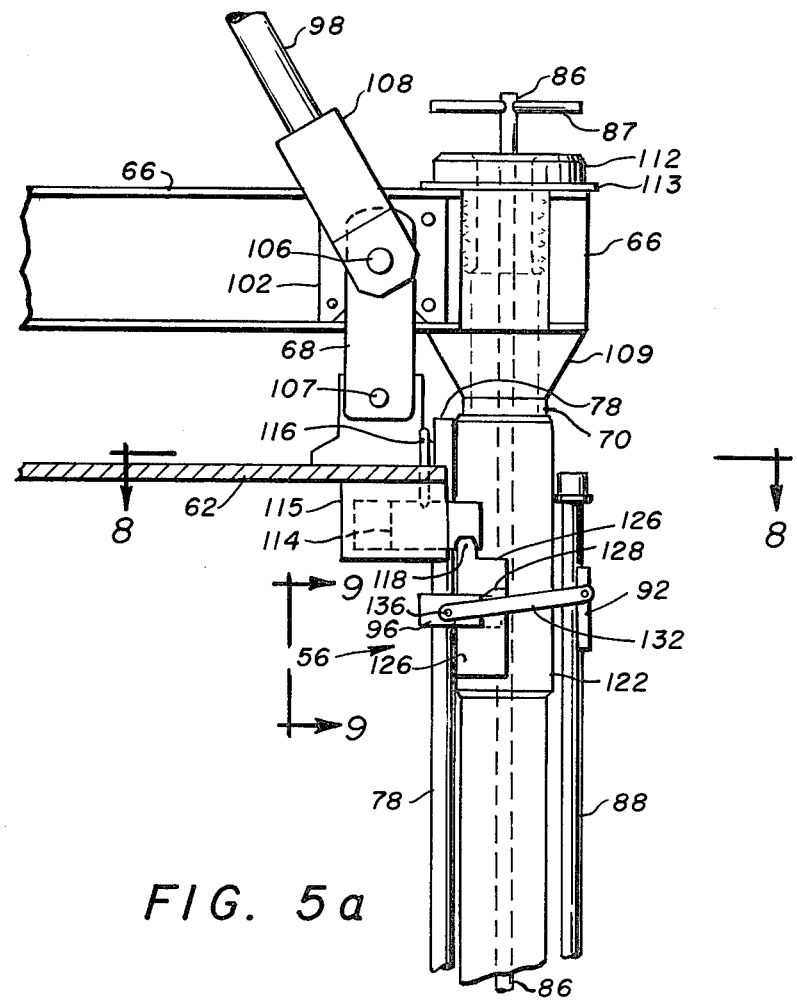
FIG. 5a shows the rod support member locked in the maximum up position corresponding to FIG. 4, illustrating the dead bolt assembly and the automatically actuated stop.
Figure 5B:
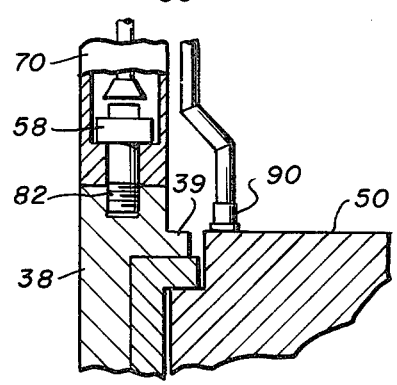
FIG. 5b shows in detail the relationship of the vessel and automatic stop actuator when the rig is in the position shown in FIG. 3.
Figure 8:
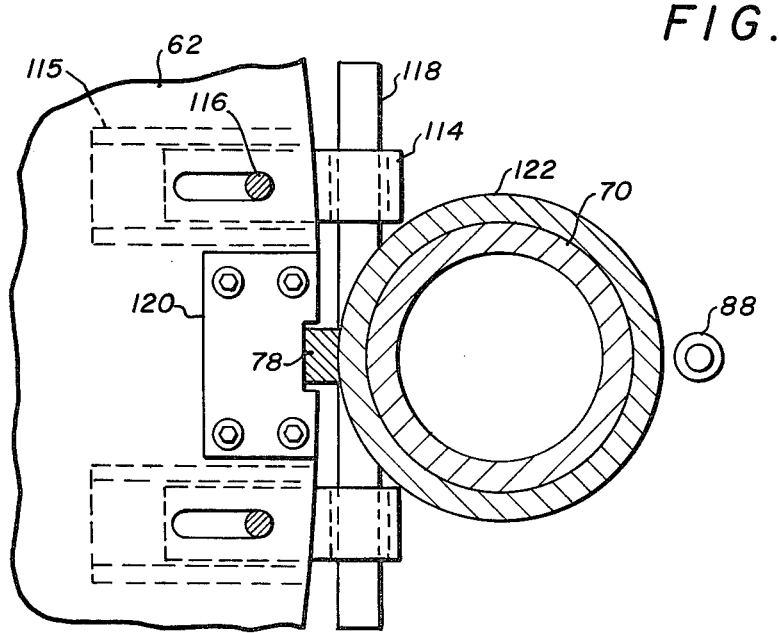
FIG. 8 shows a cross section along the line 8—8 of FIG. 5a illustrating the dead bolt arrangement, where for clarity the automatic stop structure is omitted except for the support bar which engages the dead bolt.

Referring to FIG. 3, 5a, and 5b, one column 70 and its associated structure are shown in detail, but it should be understood that all columns 70 will in the preferred embodiment have similar structures. A guide bar 78 is attached to the column 70 and runs from the lower stop 80 upward to the collar 122 near the top of column 70. As shown in FIG. 8, the guide plate 120 on the platform 62 slides along the guide bar 78 as the platform 62 reciprocates within the frame 56. The guide plate 120 interacts with the guide bar 78 to prevent rotational motion of the platform 62 as it reciprocates within the frame 56.

FIG. 5a shows the relationship of the platform 62, link block 68, cross beams 66, and column 70 when the platform is locked in the up position within the frame 56. In this view, the closer cross beam 66 and its interference plate 102 are not shown. Reference to FIG. 6 will facilitate understanding of the details of FIG. 5a. The end of the shown cross beam 66 is behind column 70 and rests on an annular support 109 formed around the column 70. The column cap 112 is threaded into column 70 and torqued against a rectangular washer 113 which is seen in FIG. 6 to cover both cross beams 66 at each corner of the delta beam spreader. The cross beams 66 are thus rigidly connected to the frame 56, and in particular, it can be seen that when the link block 68 is raised against the interference plate 102 and cross beams 66, the upward force is transferred to the frame 56 so that the UGS 36 may be lifted.

When the UGS 36 and the control rods 30 contained therein are stationary on the floor of the UGS storage pit 46, the upper portion of the rig 54 can be disassembled and used to lift other core components such as the core support barrel 26. In the preferred embodiment, the wrench handle 87 is removed, the column cap 112 is unscrewed from the column 70 and the yoke pin 107 is removed. The crane can then lift the cross beams 66, column cap 112, washer plate 113, tie rod 98, tie rod tongue 108, and link block 68 to be used in another operation. The remaining rig structure will continue performing the intended function of suspending the control rod fingers 24 within the UGS 36 provided, of course, that the platform 62 is locked in the maximum upward position within the frame 56.

In the preferred embodiment, the platform 62 can be locked in the maximum up position in two different ways, as shown in FIG. 5a. In the mannually operated method, operating personnel standing on the platform 62 move the dead bolt handle 116 so that the dead bolt 114 engages the support bar 118 formed on the upper portion of stop support 126 attached to column 70 by collar 122. Dead bolt 114 is located in dead bolt box 115 attached to the underside of the platform 62. As shown in FIG. 8, the dead bolts 114 are disposed on either side of, and below, the guide plate 120. It can be seen that when the dead bolt handles 116 are in the extreme left position the dead bolts 114 are completely within the box 115 and the platform 62 is free to slide past the stop support 126. The platform 62 can thus be positioned as desired within the frame 56. When the platform 62 is in the maximum upward position with the frame, the dead bolt handle 116 can be moved to the right-most position to engage the support bar 118, locking the platform 62 in essentially the maximum vertical position.

An independent, automatic stop means is also provided in the preferred embodiment. The purpose of the automatic stop is to prevent the movement of the platform 62 unless the lift rig 54 is positioned on the UGS 36 when the UGS is on the vessel 12. This is an important safety feature because when the control rods 30 are attached to the platform 62 and the platform is not positioned directly above the vessel 12, the downward motion of the plate 62 may cause the control rod fingers 24 to hit unyielding objects and be damaged. Only when the lift rig 54 is in the position shown in FIG. 3 is it desirable that the platform 62 be movable within the frame 56. Referring again to FIG. 5, an automatic stop actuator 88 runs vertically along each column 70 and has a foot 90 which, as shown in FIG. 4, hangs below the UGS rim 39 under all circumstances except when, as shown in FIG. 3 and FIG. 5b, the rig 54 is resting on the UGS 36 when the UGS is inside the vessel 12. In this latter condition, the foot 90 is pushed upward by contact with the reactor vessel ledge 50.

The actuator 88 automatically operates the gate 92 and latch 96 which prevents the platform 62 from moving downward within the frame except when the actuator 88 is in the up position. The gate 92 connects the actuator 88 to a pair of latches 96 which in the locking position extend horizontally from column 70, alongside the guide bar 78, and under the platform 62. In this position, the latch 96 rests on a stop support 126 which is rigidly connected to the collar 122. The latches 96 are shown in phantom FIG. 6 in their horizontal position beneath platform 62. When the actuator 88 is in the up, or unlocked position, the latch 96 is in a vertical orientation (not shown) and out of the vertical path of the platform 62 as it travels along the guide bar 78.

Figure 10:
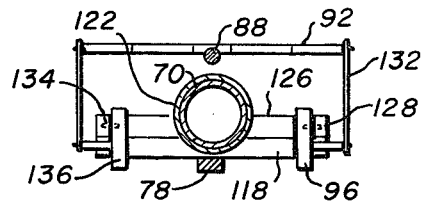
FIG. 10 shows a plan view of FIG. 9.
Figure 9:
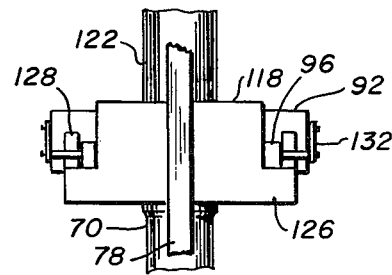
FIG. 9 shows a simplified view in the direction 9 of FIG. 5a where for clarity the dead bolt box has been deleted.

FIGS. 9 and 10 show the operation of the automatic stop mechanism in more detail. In FIG. 9, it may be seen that the stop support 126 is attached to the collar 122 in a manner tht does not obstruct the guide bar 78. In FIG. 10, it may be seen that the latch 96 is pivotally connected at 134 to an upright portion of step 128 and at 136 to a gate link 132 which is connected to the gate 92.

In actual operation, the actuator 88 would be in the down, or locked position, as the rig is lowered towards the uncovered reactor vessel 12 in the condition shown in FIG. 2. When the rig 54 is on the vessel 12 as shown in FIG. 3, the automatic latch 96 is in the vertical, or unlocked position so that the platform 62 can reciprocate within the frame 56. When the platform 62 with the control rods attached thereto is lifted to the maximum height within the frame 56 and the crane 52 continues pulling, the rig 54 will lift the upper guide structure 36 out of the vessel 12. As the UGS 36 rises above the vessel 12, the weight of the actuator 88 causes the foot 90 to drop relative to the bottom of column 70, thereby operating the gate 92 and latch 96 such that the latch 96 moves from a vertical to the horizontal position below the platform 62, as shown in FIG. 5a. The latches 96 are horizontally oriented during the movement of the rig 54 towards the storage pit 46, during the entire storage period as shown in FIG. 4, and during the return of the rig 54 to the reactor vessel 12 after the fuel has been shuffled. Only after the UGS 36 is fully within the vessel 12 does the latch 96 return to the unlocked (vertical) orientation so that the platform 62 can be lowered to reinsert the control rods 30 into the fuel assemblies within the vessel.

Although the preferred embodiment shows both the dead bolt and self-actuated stop arrangements, they are independent and one may be used without the other. In addition, it may be appreciated that although the preferred embodiment shows the actuator 88 being responsive to contact with the vessel ledge, it could be responsive to contact with any structure having a fixed relationship to the vessel.

What is claimed is:

1. For use in a nuclear reactor installation having a vertically reciprocable crane above a vertically oriented reactor vessel, the vessel containing a core, a plurality of control rods in the core and an upper guide structure in which are disposed a plurality of control rod drive shafts connected to the control rods, an apparatus for removing and reinserting the upper guide structure and control rods from the opened reactor vessel, comprising:
   a rigid, vertical frame for placement on the upper guide structure having means at its lower end for selective attachment to the upper guide structure and having interference means at its upper end; and
   a control rod support member vertically reciprocable within said frame, said support member including a horizontal platform having gripper means on its underside for simultaneously engaging each drive shaft, said platform including link means connectable to the crane for reciprocating said support member whereby the control rods may be withdrawn from the reactor core into the upper guide structure, said member further having selected surfaces adapted to abut said interference means when said platform is in its maximum vertical position relative to said frame whereby continued upward force by the crane is transferred through the link means to the frame so that the upper guide structure and control rods may be removed simultaneously from the reactor vessel.

2. The apparatus of claim 1 further comprising stop means between said frame and said support member for locking and unlocking said platform in the maximum vertical position relative to said frame.

3. The apparatus of claim 2 wherein said stop means is actuated in response to the position of said frame relative to the vessel.

4. The apparatus of claim 2 wherein said frame comprises a plurality of spaced apart, parallel columns connected at their tops by rigid horizontal beams, said beams forming said interference means.

5. The apparatus of claim 4 wherein said link means includes a plurality of link blocks located on the upper surface of said platform such that said blocks contact said beams when said platform is in the maximum vertical position relative to said frame.

6. The apparatus of claim 5 wherein said beams are detachable from said frame.

7. The apparatus of claim 5 wherein the lower ends of said columns include said means for attaching the upper guide structure.

8. The apparatus of claim 7 wherein said stop means is actuated in response to the position of said frame relative to the vessel.

9. The apparatus of claim 8 wherein said stop means includes a vertically movable actuator rod; and latch means pivotally connected to said frame and to said actuating rod, said latch means having a stop position for preventing said plate from moving below said latch and a neutral position for permitting unobstructed vertical motion of said platform, said latch means being responsive to the vertical movement of said actuating rod.

10. The apparatus of claim 9 wherein said latch means is in the stop position except when said actuating rod is in mechanical contact with said vessel.

11. The apparatus of claim 10 wherein said stop means further includes a collar fixedly attached around said column, said collar carrying a stop support to which said latch means is pivotally connected.

12. The apparatus of claim 11 further comprising a dead bolt carried by the platform and horizontally slidable relative thereto; and wherein said latch support has an upper porting forming a support bar onto which said dead bolt can be placed.

* * * * *